(12) United States Patent
Erlenbach

(10) Patent No.: US 8,887,929 B2
(45) Date of Patent: Nov. 18, 2014

(54) TOOL CADDY FOR AUTOMOBILE LIFT

(71) Applicant: Marc Erlenbach, Brooklyn, NY (US)

(72) Inventor: Marc Erlenbach, Brooklyn, NY (US)

( * ) Notice: Subject to any disclaimer, the term of this patent is extended or adjusted under 35 U.S.C. 154(b) by 0 days.

(21) Appl. No.: 14/246,107

(22) Filed: Apr. 6, 2014

(65) Prior Publication Data

US 2014/0201976 A1   Jul. 24, 2014

Related U.S. Application Data

(63) Continuation of application No. 14/076,546, filed on Nov. 11, 2013.

(51) Int. Cl.

| | |
|---|---|
| *A47F 7/00* | (2006.01) |
| *A47F 5/00* | (2006.01) |
| *A47B 43/00* | (2006.01) |
| *A47B 47/00* | (2006.01) |
| *A47B 57/00* | (2006.01) |
| *F16M 13/02* | (2006.01) |
| *B25H 5/00* | (2006.01) |
| *D06F 57/12* | (2006.01) |
| *B25H 3/04* | (2006.01) |
| *B25H 1/00* | (2006.01) |
| *E05D 11/10* | (2006.01) |

(52) U.S. Cl.
CPC ............... *F16M 13/02* (2013.01); *B25H 5/00* (2013.01); *D06F 57/122* (2013.01); *B25H 3/04* (2013.01); *B25H 1/0064* (2013.01); *E05D 11/1085* (2013.01); *E05D 11/1071* (2013.01); *A47F 5/0006* (2013.01)
USPC ........ 211/70.6; 211/86.01; 211/193; 248/690

(58) Field of Classification Search
CPC ............ B25H 3/04; B25H 3/06; B25H 3/003; B25H 3/00; B25H 5/00; B25H 1/08; B25H 1/10; B25H 1/12; B25H 1/0021; B25H 1/0042; B25H 1/005; B25H 1/0057; B25H 1/0064; A47F 7/0028; A47F 7/0021; A47F 7/0035; A47F 5/006; A47F 5/08; A47F 5/0807; A47K 1/09; A47L 13/512; D06F 57/12; D06F 57/122; E05D 11/00; E05D 11/10; E05D 13/1071; E05D 11/1085; A47C 7/62; B60N 3/001; A47B 31/06; A47B 57/42; A47B 57/52; A47G 25/0614; A47G 25/0621; A47G 25/0635; A47G 25/0642; A47G 29/00; F16B 45/00; B60R 7/08; B60R 7/10; E06B 1/20; E06B 1/18; E06B 1/30; E06B 1/62; E06B 1/10; F16M 13/02
USPC ............ 211/85.23, 88.03, 70.6, 119.003, 66, 211/119.009, 119.004, 119.007, 86.01, 211/13.1, 193; 248/690, 301, 304, 311.2, 248/339; 224/556, 42.11; D3/231; 52/212; 269/289 R, 302.1, 297, 271; 220/475; 206/372
See application file for complete search history.

(56) References Cited

U.S. PATENT DOCUMENTS 1,915,958 A * 6/1933 Skirrow .................. 248/300
2,878,945 A * 3/1959 Speir ..................... 211/119.007

(Continued)

*Primary Examiner* — Jennifer E Novosad
(74) *Attorney, Agent, or Firm* — Michael J. Feigin, Esq.; Feigin & Associates, LLC

(57) ABSTRACT

In an embodiment of the disclosed technology, a tool caddy is removably mountable to a fixed portion of an automobile lift. The tool caddy is generally rigid, having a conical section and a cantilevered section. A U-shaped mounting bracket is adapted to be placed atop and/or around any fixed rectangular/square section of the lift. The conical section is shaped to accommodate an impact gun or other similarly sized and/or shaped tool. The cantilevered section has several portals disposed in a surface thereof for holding smaller tools. The tool caddy will secure in place, when it is A) wedged at least partially through the triangular opening of a truss, B) rested atop a rectangular portion of a beam of a truss, or C) slid along a beam until the top plate of the mounting bracket is wedged into a portion of the truss where the triangular section meets the beam.

5 Claims, 8 Drawing Sheets

(56) References Cited

U.S. PATENT DOCUMENTS

| | | | |
|---|---|---|---|
| 3,342,343 A * | 9/1967 | Youlden | 211/88.01 |
| 4,123,024 A * | 10/1978 | Levy | 248/214 |
| 4,480,810 A * | 11/1984 | Hall | 248/238 |
| 4,643,342 A * | 2/1987 | Borelli, III | 224/541 |
| 5,249,770 A * | 10/1993 | Louthan | 248/311.2 |
| 5,673,885 A * | 10/1997 | Pham | 248/210 |
| 5,785,222 A * | 7/1998 | Basso et al. | 224/555 |
| 5,813,579 A * | 9/1998 | Hendrickson | 224/42.11 |
| 6,032,808 A * | 3/2000 | Henson | 211/85.23 |
| 6,227,511 B1 * | 5/2001 | De Costa | 248/311.2 |
| 6,352,135 B1 * | 3/2002 | Jones | 182/129 |
| 6,467,744 B1 * | 10/2002 | Calin | 248/214 |
| 6,484,989 B1 * | 11/2002 | Connery | 248/311.2 |
| 7,322,551 B2 * | 1/2008 | Simonsen | 248/231.81 |
| 7,387,224 B1 * | 6/2008 | Backus | 224/42.11 |
| 7,588,225 B2 * | 9/2009 | Wawerski | 248/311.2 |
| 7,887,017 B2 * | 2/2011 | Moran | 248/339 |
| 7,931,161 B2 * | 4/2011 | Newbould et al. | 211/106 |
| 7,938,279 B2 * | 5/2011 | Kaplan | 211/119.009 |
| 8,371,473 B2 * | 2/2013 | Scribner et al. | 220/751 |
| 8,505,795 B2 * | 8/2013 | Dunn | 224/556 |
| 8,550,550 B2 * | 10/2013 | Cassese et al. | 297/188.18 |
| 8,556,091 B2 * | 10/2013 | Cutler | 211/119.009 |
| 2004/0238466 A1 * | 12/2004 | Shiao | 211/70.6 |
| 2005/0051690 A1 * | 3/2005 | Phillips et al. | 248/311.2 |
| 2006/0284041 A1 * | 12/2006 | Segretto | 248/311.2 |
| 2009/0095568 A1 * | 4/2009 | Webster et al. | 182/129 |
| 2010/0084531 A1 * | 4/2010 | Schuchman | 248/311.2 |
| 2010/0127028 A1 * | 5/2010 | Lusk | 224/401 |

* cited by examiner

TOOL CADDY FOR AUTOMOBILE LIFT

FIELD OF THE DISCLOSED TECHNOLOGY

The disclosed technology relates generally to tools used by an automobile mechanic and, more specifically, to a temporary caddy for storing common auto mechanic tools at a convenient and accessible location.

BACKGROUND OF THE DISCLOSED TECHNOLOGY

Automobile mechanics utilize many different tools while practicing their trade. When working besides, or on the underside of, an automobile, multiple tools may be required to perform various tasks. Convenient accessibility to such tools can expedite the completion of the task. Having all the tools in a single place facilitates a more efficient use of time.

Mechanics may choose to wear a tool belt, which keeps compact tools at their waist. However, bulky tools, such as an impact gun or three pound mallet, are too large and heavy to be worn on a tool belt. Moreover, many impact guns used by mechanics are powered by compressed air, which requires an air hose to be connected to the impact gun from an air compressor. As such, it would be difficult to move around a garage while carrying an impact gun connected to a compressed air source.

Lack of accessible storage for such bulky tools can also lead to risk of injury. If a compressed air impact gun is left lying on the floor or balanced on the leg of the lift whilst work is being performed on an automobile, there is a chance that a person may trip over the impact gun and/or the air hose. There is further a chance that a balanced impact gun will be shaken or jogged and fall off the leg of the lift, possibly causing bodily harm.

Therefore, there is a need, unfulfilled in the prior art, to provide an accessible and convenient way to store commonly used tools in an automobile mechanic's garage, and/or within very close proximity to the part of the vehicle that is being worked on.

SUMMARY OF THE DISCLOSED TECHNOLOGY

Therefore, it is an object of the disclosed technology to provide a tool caddy adapted to be temporarily mounted on a portion of an automobile lift.

As such, in an embodiment of the disclosed technology, a tool caddy has a conical section, a mounting bracket and a cantilevered plate with a plurality of holes. The conical section, a mounting bracket, and a cantilevered plate may be affixed in a series, such that they occupy a single axis.

The conical section has a first oval opening and a second circular opening. The first oval opening has a larger diameter than the second circular opening, such that the conical section has a tapering cross-section between a top and bottom portion thereof. The oval openings may be circular or other shapes, in embodiments of the disclosed technology. The "top" of the conical section is the portion of the conical section having a oval opening of a larger diameter. The "bottom" of the conical section has a circular opening with a smaller diameter than that of the top conical section. In terms of general orientation, the "bottom" of the conical section is that portion of the conical section that is the closest to the ground with respect to the force of gravity. As such, the conical section is adapted to receive and cradle, under the force of gravity, an impact gun or other similarly shaped tools (drill, air hammer, die grinder etc.).

The mounting bracket is formed of a first plate and a second plate, which are arranged in parallel to one another. A top plate is perpendicularly disposed and fixedly attached to and between the first and second side plates, thus forming a U-shape. The first side plate is further fixedly attached to the conical section. The cantilevered plate is perpendicularly disposed and fixedly attached to the second side plate. The cantilevered plate is disposed on an opposite side of the tool caddy from the conical section. The mounting bracket forms a cavity which may receive a beam.

A method of using the above-disclosed tool caddy may be carried out, not necessarily in the following order, by: a) placing the tool caddy at least partially through a triangular opening of a truss; b) resting the mounting bracket atop a rectangular portion of a beam of the truss; c) sliding the mounting bracket along the beam until the top plate of the mounting bracket is wedged into a portion of the truss forming an acute angle. The wedging into this tight angle along with the snug fit of the mounting bracket, acts as a temporary lock and stabilizer for the tool caddy. The tool caddy will only become unlocked when it is un-wedged and slid back. Then, it can be removed from the truss. Tools may also be placed into the tool caddy.

In another embodiment of the disclosed technology, a method for caddying tools is carried out, not necessarily in the following order, by: a) placing a mounting bracket through a triangular opening of a truss, wherein said mounting bracket has a conical section affixed to a first side thereof and a cantilevered plate affixed to a second side thereof, said first side opposite said second side; b) resting said mounting bracket atop a rectangular portion of a beam of said truss; c) sliding said mounting bracket along said beam such that a top of said mounting bracket is wedged into a portion of said truss forming an acute angle and securing it in place. A further step may be carried out where d) one or more tools are placed through each of the conical sections and the cantilevered plate. Through the use of gravity, the weight of the device and tools placed therein further assists in preventing the dislodging of the caddy or provide additional counterbalancing support in abnormal situations.

In still another embodiment of the disclosed technology, a tool caddy is formed of a partial rectangular section, with a first tool holder on a first side of the partial rectangular section and a second tool holder on a second side of the partial rectangular section. The first side is opposite to the second side, and the first tool holder and the second tool holder extend away from one another and away from the partial rectangular section.

In a further embodiment, the first tool holder is a first conical section, and the second tool holder is a cantilevered plate having a plurality of holes disposed therein. In still another embodiment, the first tool holder is a first conical section, and the second tool holder is a second conical section. In yet another embodiment, the first tool holder is a first cantilevered plate having a plurality of holes disposed therein, and the second tool holder is a second cantilevered plate having a plurality of holes disposed therein.

It should be understood that the use of "and/or" is defined inclusively such that the term "a and/or b" should be read to include the sets: "a and b," "a or b," "a," "b."

DETAILED DESCRIPTION OF EMBODIMENTS OF THE DISCLOSED TECHNOLOGY

In an embodiment of the disclosed technology, a tool caddy is mountable to a portion of an automobile lift for temporarily storing tools for convenient access. The caddy generally employs a front portion and an opposing back portion. The terms "front" and "back" are relative terms, and are used only for purposes of differentiating portions of the caddy. The front and back portions are connected via a generally U-shaped mounting bracket for mounting the caddy on a fixed surface. The front portion is defined by a conical section. The conical section has two openings, and a tapered cross section for purposes of accommodating an impact gun or other similarly shaped tools. The back portion is defined by a generally flat, cantilevered section having at least one cutout disposed therein for accommodating tools.

Embodiments of the disclosed technology will become clearer in view of the following description of the drawings.

Figure 1:
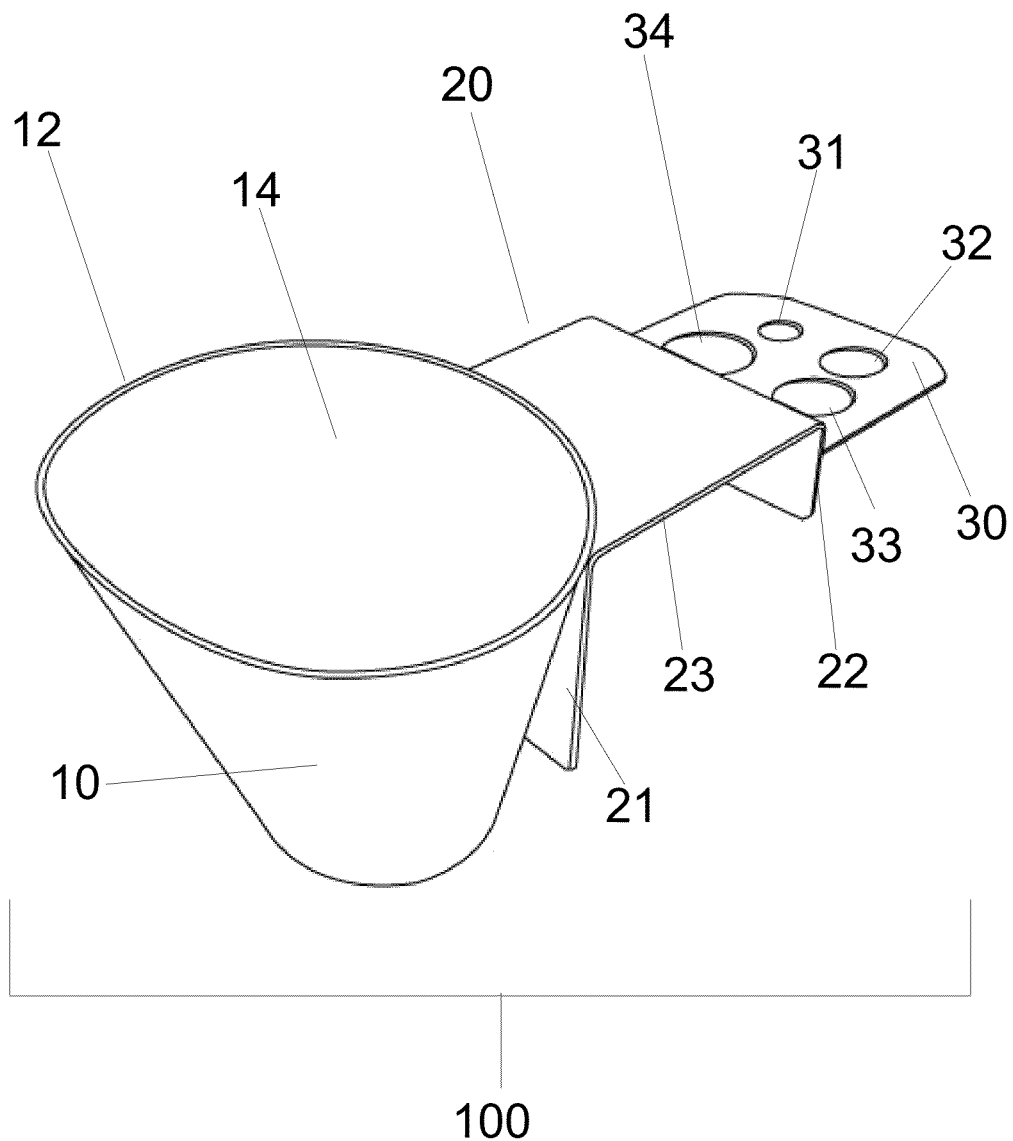
FIG. 1 is a front perspective view of a caddy of an embodiment of the disclosed technology.
Figure 2:
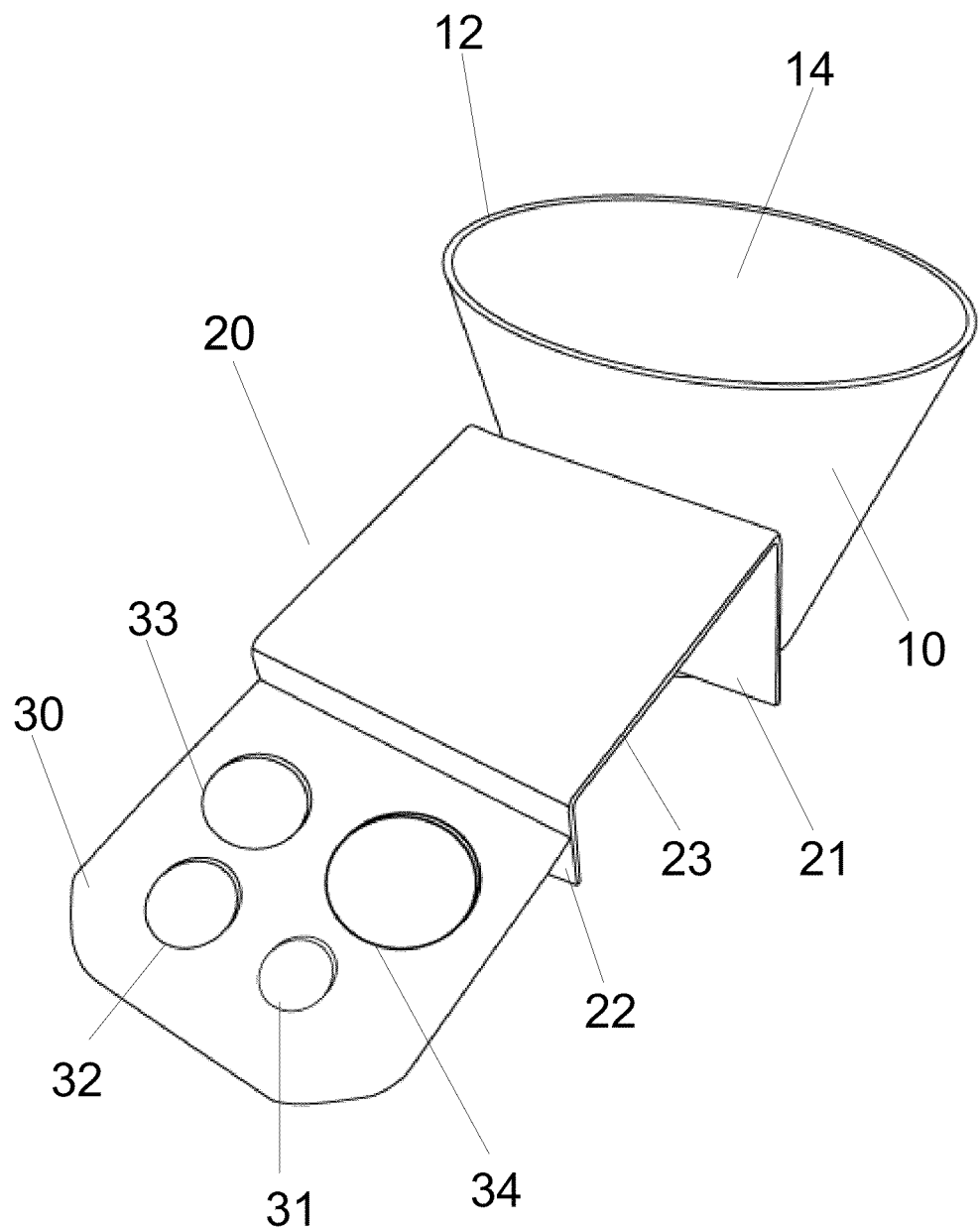
FIG. 2 is another back perspective view of a caddy of an embodiment of the disclosed technology.

FIGS. 1 and 2 are front and back perspective views of a caddy of an embodiment of the disclosed technology. The caddy 100 is generally formed of three sections 10, 20, 30. The sections may be welded and/or molded together such that a single, rigid body is formed. For purposes of this disclosure, such methods are considered to form a "unitary structure"; that is, a single structure which moves and functions as one. A conical section 10 is disposed at a front end of the caddy 100. The conical section 10 is hollow, having a top rim 12 and a bottom rim 16. Each rim, both 12 and 16, defines an aperture through which a portion of a tool may be placed. The conical section 10 may be used for storing an impact gun or similarly shaped and/or sized tools. The tapered interior surface 14 of the conical section 10 cradles the impact gun for easy storage and removal.

The back side of the caddy 100 is defined by a relatively planar, cantilevered plate section 30 that extends horizontally from the caddy. The cantilevered section 30 has a plurality of holes/cutouts 31-34 disposed through the surface thereof for caddying different sized tools.

The conical section 10 and the cantilevered section 30 are connected to one another by a mounting bracket 20. The mounting bracket 20 is generally U-shaped, being formed of generally three planar surfaces—a top and two sides. The mounting bracket 20 is shaped to be mounted to a fixed object, such as the arm of an automobile lift. The three surfaces of the mounting bracket 20 are adapted to rest on or "hug" a surface of an object having a square or rectangular cross-section. The mounting bracket 20 is formed of a first side plate 21 and a second side plate 22, which are arranged in parallel. The mounting bracket 20 also has a top plate 23 which is perpendicularly affixed to the first side plate 21 and the second side plate 22 to form a U-shaped bracket. The mounting brackets 21, 22 and 23 may also be formed from one continuous piece of material to create the U-shape mount.

The conical section 10 is affixed to the exterior surface of the first side plate 21. A side edge of the conical section 10 may be abutted and affixed to the first side plate 21. such that the conical section may be oriented somewhat at an angle, due to the tapered nature of the conical section. The conical section may also be molded as part of the first side plate 21 and/or the complete mounting bracket assembly.

The cantilevered section 30 is affixed perpendicularly to the second side plate 22, such that it opposes the conical section 10 with respect to the mounting bracket 20. As such, the cantilevered section 30 forms a planar plate which extends outwardly from the second side plate 22. The cantilevered section 30 may also be molded as one piece with a second plate 22 and/or the complete mounting bracket assembly.

Figure 3:
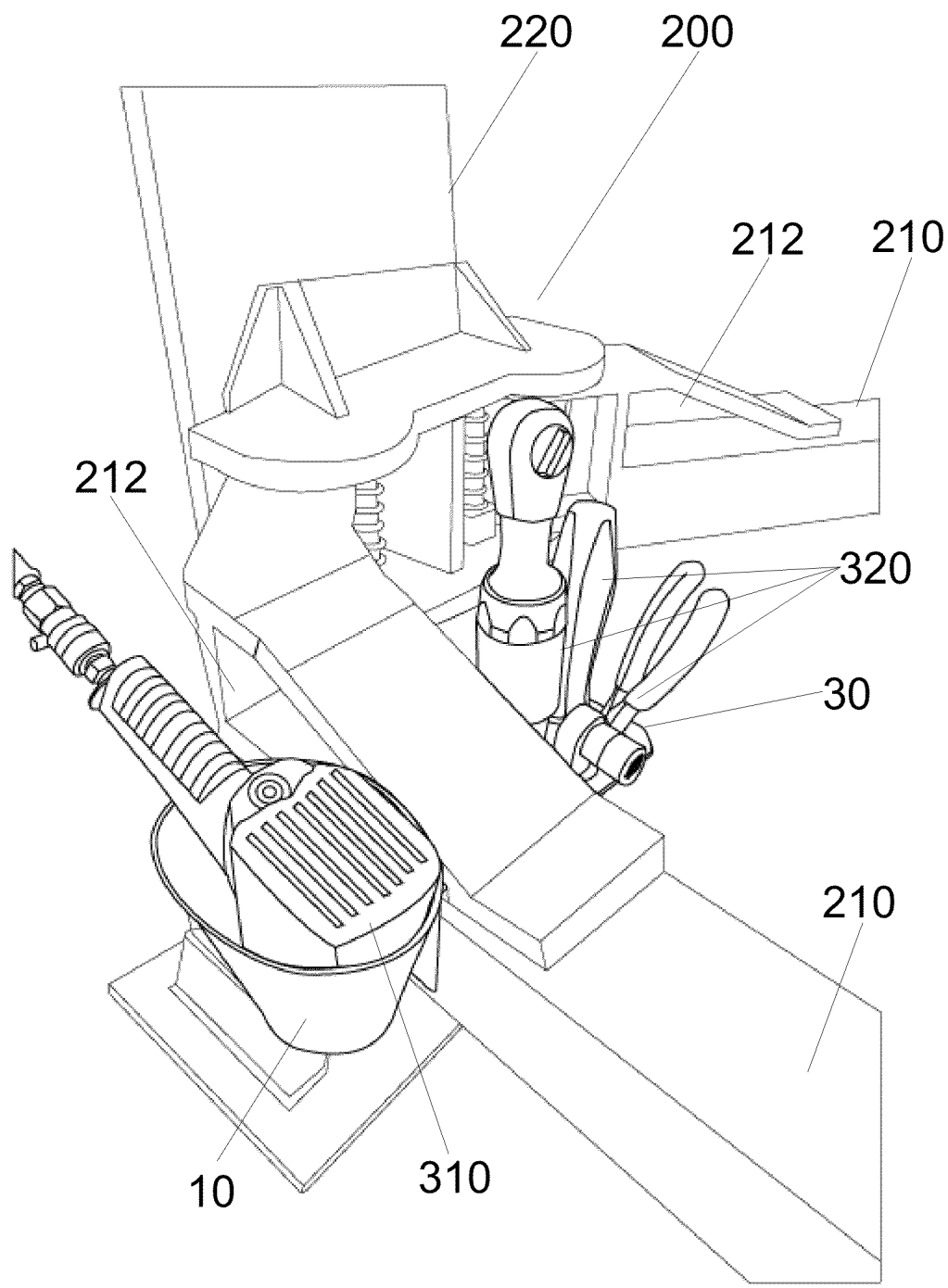
FIG. 3 is a front perspective view of a caddy mounted to an automobile lift, according to an embodiment of the disclosed technology.
Figure 4:
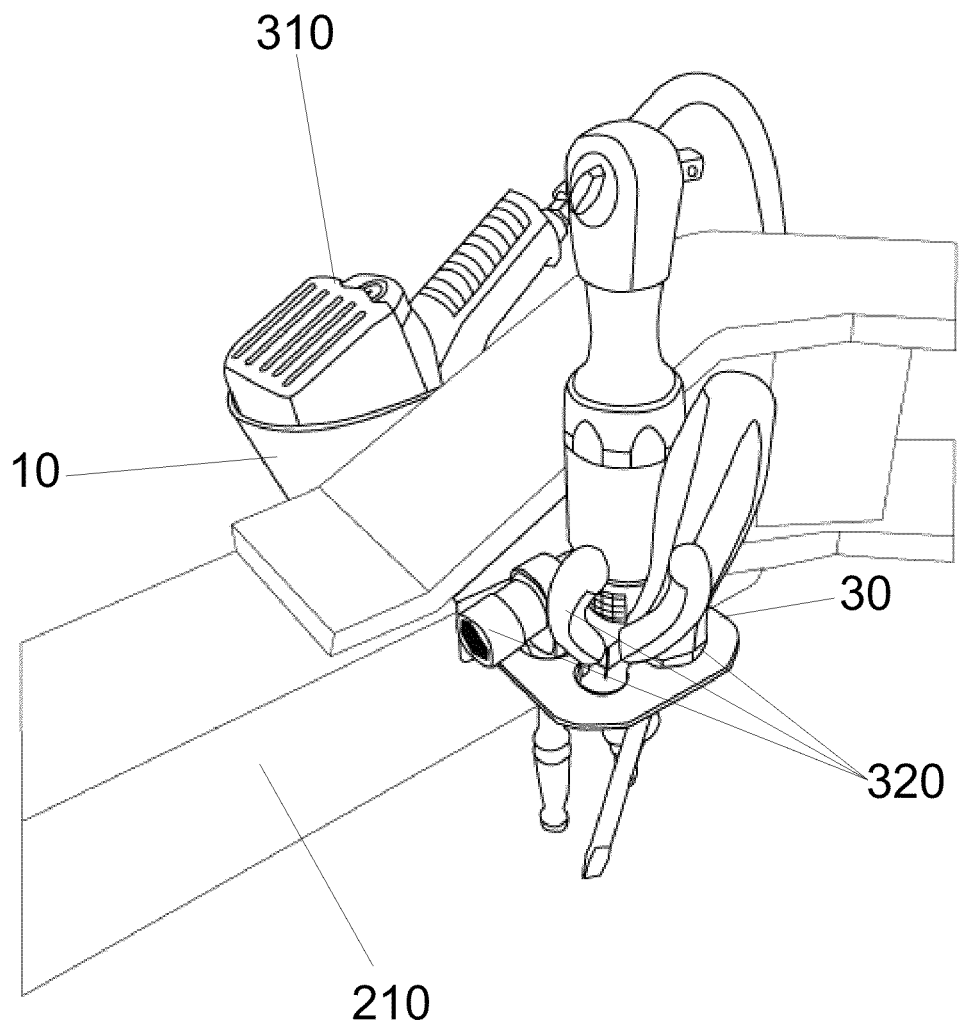
FIG. 4 is a back perspective view of a caddy mounted on an automobile lift, according to an embodiment of the disclosed technology.

FIGS. 3 and 4 are front and back perspective views of a caddy mounted to an automobile lift, according to an embodiment of the disclosed technology. A standard automobile lift 200 is shown. The lift 200 generally has a vertical column 220 with one or more horizontal arms 210. The horizontal arms 210 are capable of being raised and/or lowered along the height of the column 220. In operation, the arms 210 are placed at their lowest position, and an automobile is driven into a position between the two columns. The arms 210 are placed below the automobile, and a hydraulic lift causes the arms to lift the automobile to enable mechanic access to the underside thereof.

Given the proximity of the arms 210 to the underside of the automobile, the arms provide an ideal mounting location for the caddy 100. Referring still to FIGS. 3 and 4, the arm 210 has a truss section forming a triangular portal 212. In the embodiment shown, the caddy 100 is mounted to the arm at the truss section. To mount the caddy 100, the cantilevered section 30 may be placed through the triangular portal 212. In the absence of tools, the caddy mounting bracket 20 rests on the top surface of the arm 210. The side plates 21, 22 of the mounting bracket 20 abut the sides of the rectangular portion of the arm of the truss.

Tools 310, 320 are shown residing in the caddy 100. Large tools, such as an impact gun 310 shown in FIGS. 3 and 4, may be stored in the conical section 10 of the caddy 100. The tapered, conical shape of the conical section 10 cradles larger tools such as impact guns, drills, torches, and/or air nozzles. Small tools 320, such as screwdrivers, pliers, and ratchet/socket wrenches, may be stored in the cutouts 31-34 of the cantilevered plate section 30.

Figure 7:
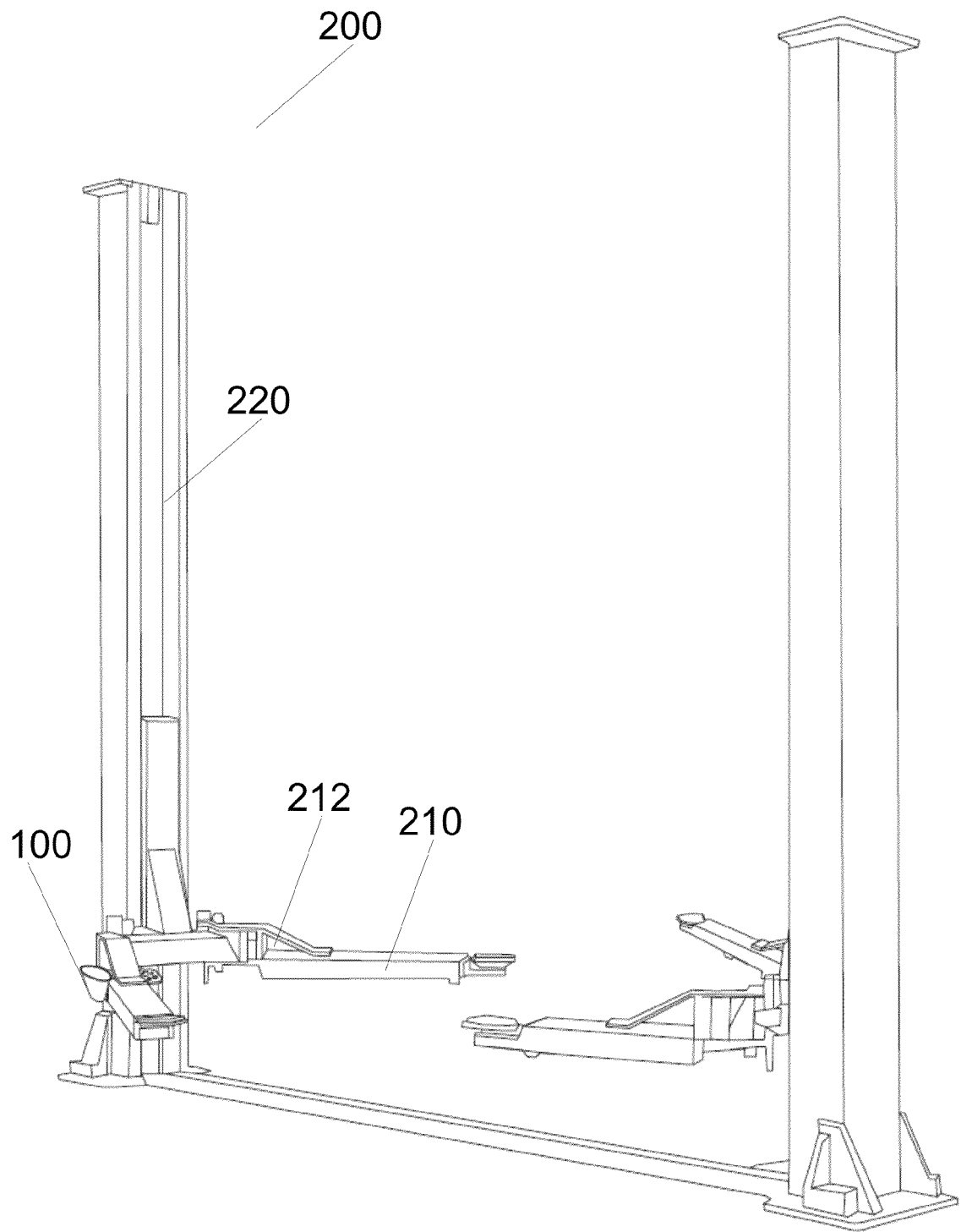
FIG. 7 is a perspective view of an automobile lift of the prior art with the caddy of embodiments of the disclosed technology installed.
Figure 8:
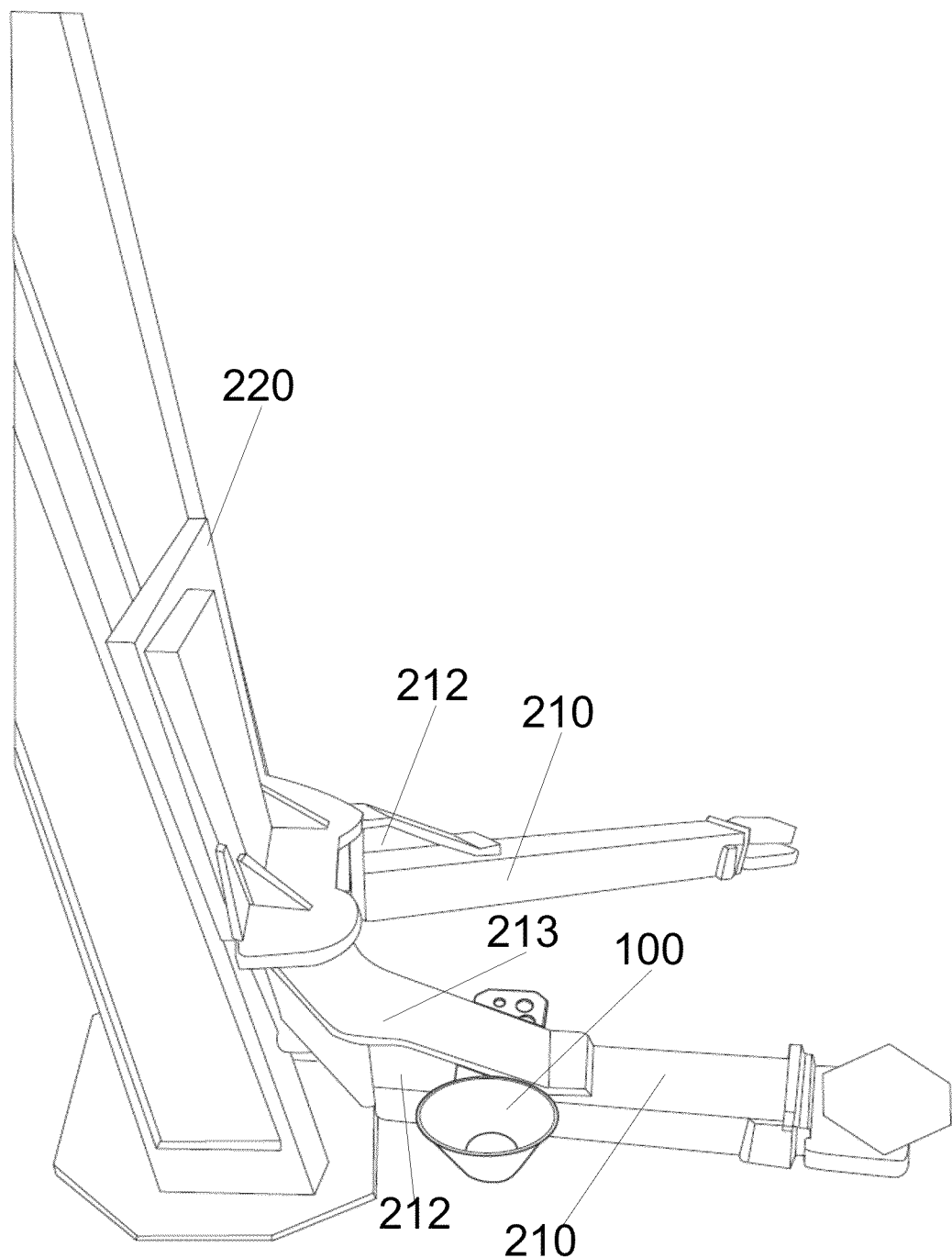
FIG. 8 is a perspective view of the area of the arms of the automobile lift of FIG. 7 where a caddy of embodiments of the disclosed technology is installed.

Skipping now to FIG. 7, this figure shows a perspective view of an automobile lift of the prior art, with the caddy of embodiments of the disclosed technology installed. FIG. 8 is a perspective view of the area of the arms of the automobile lift of FIG. 7, where a caddy of embodiments of the disclosed technology is installed. The automobile lift 200 has arms for lifting an automobile up a vertical rise 200, such as by using arms 210. Each arm 210 has a triangular portal 212. Referring specifically to FIG. 8, it can readily be seen how the caddy 100 is placed and wedged in the triangular space 212, and by being pushed against the position where the diagonal support 213 meets the automobile support arm 210.

Figure 5:
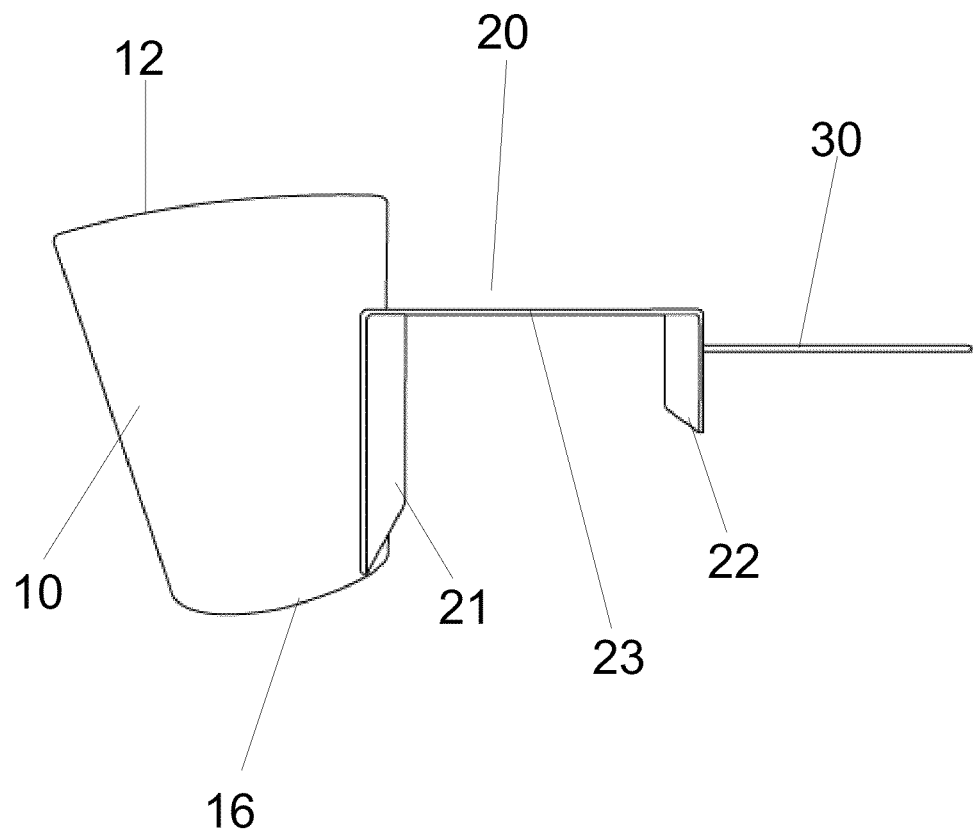
FIG. 5 is a side view of a caddy of an embodiment of the disclosed technology.

FIG. 5 is a side view of a caddy of an embodiment of the disclosed technology. As shown, the mounting bracket 20 forms a partial rectangular section having a first side plate 21, a second side plate 22, and a top plate 23. The mounting bracket need not necessarily form a rectangular section, insofar as the first and/or the second side plates 21, 22 may be affixed and/or molded to the top plate 23 at an angle or curve, depending on the surface onto which the tool caddy 100 is to be mounted. Likewise, the cantilevered plate section 30 is shown perpendicularly extending from the second side plate 22 of the mounting bracket 20. However, the cantilevered plate section 30 need not form a right angle with the second side plate 22. That is, the cantilevered plate section 30 may be affixed and/or molded at an angle within ±45° degrees of 90° degrees.

Figure 6:
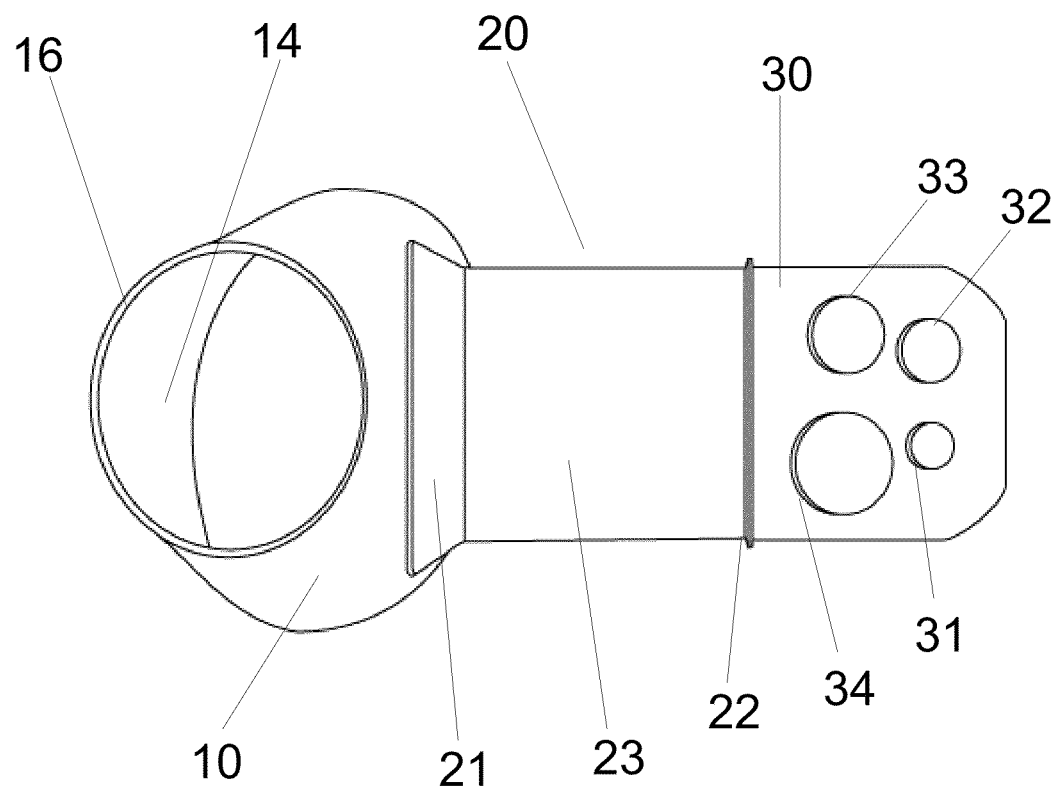
FIG. 6 is a bottom view of a caddy of an embodiment of the disclosed technology.

FIG. 6 is a bottom view of a caddy of an embodiment of the disclosed technology. Cutouts 31-34 of varying sizes are shown disposed in the surface of the cantilevered plate section 30. The first cutout 31 is the smallest diameter circle. Next, the second cutout 32 has a larger diameter than that of the first cutout 31, and so forth, with the fourth cutout 34 having the largest diameter. Other shapes and sizes may be employed for the cutouts 31-34 to accommodate various tools. Furthermore, hangers and/or hooks (not shown) may be disposed on the cantilevered plate section 30 for purposes of hanging and/or caddying tools.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

I claim:

1. A method of using a tool caddy, said tool caddy, comprising a conical section having a first oval opening and a second circular opening, said first oval opening having a larger diameter than said second circular opening;

a mounting bracket having a first and a second side plate arranged in parallel, and a top plate perpendicularly disposed and fixedly attached to and between said first and second side plates forming a U-shape, wherein said first side plate is further fixedly attached to said conical section;

a cantilevered plate perpendicularly disposed and fixedly attached to said second side plate, said cantilevered plate on an opposite side of said tool caddy from said conical section; and a plurality of holes disposed in said cantilevered plate section, said method comprising steps of:

placing said tool caddy at least partially through a triangular portal of a truss;

resting said mounting bracket atop a rectangular portion of a beam of said truss; and sliding said mounting bracket along said beam until said top plate of said mounting bracket is pushed against a point where a diagonal support of said truss meets said beam, thus securing the caddy in place.

2. The method of claim 1, further comprising:

placing one or more tools into said tool caddy, such that the weight of said tools further prevents said tool caddy from becoming dislodged from said truss.

3. A method of caddying tools comprising:

placing a mounting bracket comprising a first and a second side plate arranged in parallel, and a top plate perpendicularly disposed and fixedly attached to and between said first and second side plates forming a U-shape though a triangular portal of a truss, wherein said mounting bracket has a conical section affixed to a first side thereof and a cantilevered plate affixed to a second side thereof, said first side opposite said second side;

resting said mounting bracket atop a rectangular portion of a beam of said truss; and sliding said mounting bracket along said beam such that a top of said mounting bracket is pushed against a point where a diagonal support of said truss meets said beam.

4. The method of claim 3, further comprising:

placing one or more tools into each of said conical sections and said cantilevered plate, such that said tools prevent said tool caddy from becoming dislodged from said truss.

5. The method of claim 3, further comprising:

placing one or more tools into each of said conical section and said cantilevered plate, such that said tools in said conical section counterbalance said tools in said cantilevered plate.

\* \* \* \* \*